United States Patent

[11] 3,615,812

| [72] | Inventors | Daniel Clark;<br>Edward H. Krumm, both of Holland, Mich. |
|---|---|---|
| [21] | Appl. No. | 805,950 |
| [22] | Filed | Feb. 19, 1969 |
| [45] | Patented | Oct. 26, 1971 |
| [73] | Assignee | Chemetron Corporation<br>Chicago, Ill.<br>Continuation of application Ser. No. 395,045, Sept. 8, 1964, now abandoned. |

[54] RESIN COATED PIGMENTS AND PROCESS THEREFOR
14 Claims, No Drawings

[52] U.S. Cl. .................................................. 106/308 M, 106/30, 106/309
[51] Int. Cl. .................................................. C08j 1/10
[50] Field of Search .......................................... 106/262, 308 F, 308 O, 308 R, 288 O, 309

[56] References Cited
UNITED STATES PATENTS

| 2,192,954 | 3/1940 | Sloan et al. ................ | 106/262 |
| 2,271,323 | 1/1942 | Yee ............................. | 106/262 |
| 2,539,429 | 1/1951 | Jensen ........................ | 106/308 F |
| 2,722,485 | 11/1955 | Jensen et al. ............... | 106/308 F |
| 3,296,001 | 1/1967 | Ambler et al. .............. | 106/309 |

FOREIGN PATENTS

| 893,821 | 4/1962 | Great Britain .............. | 106/308 O |

*Primary Examiner*—James E. Poer
*Attorney*—Nicholas M. Esser

ABSTRACT: A resin coated pigment is produced by intermixing a pigment in the form of a water wet press cake into a resin while maintaining the resin in the form of a stiff, doughlike mass to effect a hot dry plastic pigment-resin dispersion. The process results in a resin coated pigment of high pigment concentration being grit-free and having high tinctorial strength.

RESIN COATED PIGMENTS AND PROCESS THEREFOR

CROSS-REFERENCE TO RELATED APPLICATIONS

This application is an continuation of application Ser. No. 395,045, filed Sept. 8, 1964, now abandoned.

This invention relates to a novel process for preparing a resin coated pigment. More particularly, the present invention is concerned with the direct transferring of a pigment in the form of a water wet press cake to a highly dispersed pigment in a resin.

The customary procedure for preparing a resin coated pigment is indicated by Verbyla in U.S. Pat. No. 2,000,003 wherein a dry and finely divided pigment, such as titanium oxide and carbon black, is incorporated into a thermoplastic resinous material to provide a combined pigment and resin composition. This aggregate provides a carrier for the pigment which is later dispersed in a film-forming materials representative of which are paints, enamels, lacquers and varnishes. Walton, et al. in U.S. Pat. No. 2,613,158 also illustrates a dispersible pigment in a resin composition for paint systems as well as its advantages but the Walton et al. method for producing the desired composition like that of Verbyla employs a dry and finely divided pigment for initially dispersing in the resin. In the Walton et al. procedure, special milling techniques must be used to avoid the lumps or small pieces of pigmented resin as produced by Verbyla.

In the manufacture of many pigments it is necessary to condition them in order to improve their pigment properties. Such methods include the well-known acid pasting process and the salt grinding method wherein a conditioning agent can be employed in addition to the salt both of which must later be removed by a water wash. The use of salt and a conditioning agent is illustrated by Chun et al. U.S. Pat. No. 2,982,666 but the same water wash procedure must be used even when the salt alone is employed as a grinding agent. Whether the acid pasting or the salt grinding methods are used, the pigment which is recovered is in the form of a water wet press cake. This is also true of those pigments which do not require a grinding treatment or conditioning but are recovered in the form of a pulp or wet press cake directly from a chemical reaction medium or a reactor. In order to incorporate the wet press cake into a solid thermoplastic resin it has been necessary to dry the pigment and divide it into small particles. This is evidenced by the procedures shown by Verbyla and Walton et al. The step of drying and milling the pigment to size requires additional equipment, time and manpower and still does not result in a product containing a high concentration of pigment which is free of pigment agglomerates suitable for directly combining with a vehicle to form an ink. The product obtained by Verbyla and Walton et al. even when employing a dry pigment at the start contains agglomerates of pigment and is not suitable for an ink product unless further milling is performed.

The conventional method of manufacturing inks comprises the grinding of an ink paste from a dry powder. This method also requires considerable time, manpower and equipment to work the dry pigment into an ink formulation.

Another common method of manufacturing printing inks comprises the use of flushed paste dispersions. The flushing art, wherein a water wet pigment press cake is kneaded or mixed with a liquid organic vehicle to effect transfer of the pigment from the aqueous phase to the organic phase, is well known. The resultant "flushed" base obtained by this process is a liquid or paste type product because, invariably, the vehicle portion used in the process has been a liquid varnish, oil or other fluid organic medium. In order to be handled such flushed bases must be formulated at relatively low pigment levels and/or must contain relatively large amounts of solvent diluents. Even so they are messy and difficult to work with and restrict the formulating latitude afforded the ink maker.

It is an object of the present invention to provide a novel process for preparing a resin coated pigment. It is another object to provide a novel process for preparing a resin coated deagglomerated pigment for rapid formulation of an ink. Still further object of this invention is to provide a novel method of transferring a pigment from a wet press cake directly into a thermoplastic resin. Another object of the invention is to provide a process for preparing a resin coated pigment employing a minimum amount of steps, manpower and time. Still another object is to provide a novel resin coated pigment having higher tinctorial strength and dispersibility than previously known resin coated pigment compositions. Other objects of the present invention will be apparent to one skilled in the art from the accompanying description and claims to follow.

The foregoing objects are accomplished by the novel process and product of the present invention wherein a pigment in the form of a water wet press cake is directly transferred to a solid thermoplastic resin, preferably in the powdered form, by admixing the press cake with a thermoplastic resin. If desired, a minor amount of a suitable solvent can be employed to soften the resin. During the first stage of the process, water will break from the admixture and is subsequently removed therefrom. Frequently, more efficient removal of the water can be effected by adding the press cake portionwise and removing the water which breaks from the organic phase, composed of organic solvent and resin, in two stages. Any pigment which remains in the water can be cleared therefrom by the addition of small amount of the solvent. After removal of the water, a doughlike mass results which is subsequently mixed until sufficient heat is generated to azeotropically drive off all of the remaining water and solvent and bring the temperature of the resin to above 220° F. The doughlike mass is worked at this elevated temperature for a period to completely deagglomerate the pigment and disperse it through the resin leaving a hot, dry plastic pigment-resin dispersion which readily crumbles to a powder when cooled. The powder is pulverized and readily dissolves in a solvent or vehicle by simple mix-in techniques to provide a stable nonagglomerated ink of far superior quality to that obtained with commercial resinated pigments employing the same mix-in technique. The resinated pigment product of the present invention by readily dissolving in vehicle forms in effect an "instant ink" having higher tinctorial strength than an ink formed by other resinated products or by the conventional method of grinding an ink paste from a dry powder.

The temperature of the resin as well as the time it is worked with the pigment are essential factors in the present process. To effectively eliminate agglomerates of pigment the resin must be in a hot plastic state having a temperature at least above 220° F. and preferably above 250° F. The designated temperature is effected primarily by the working of the thermoplastic resin. An optimum temperature range of 250° F.–300 F. provides a viscosity in the resin which allows for necessary resistance to work the pigment through the resin while at the same time allowing the resin to be dispersed more readily through it. All factors being considered, such as size of batch, type of mixing equipment, amount of solvent employed to soften the resin, the average time during which the resin is worked with the pigment should be between 1–2 hours. These described conditions for deagglomerating the pigment in the resin can be effectively employed whether the pigment is originally in the form of a water wet press cake or in a dry prescreened state.

Any thermoplastic resin which will not pose a storage problem because of melting or oxidizing is operable in the present invention but those having a melting point of 100° C. or higher are preferred. When the resin is employed in the present process it should be in the form of flakes preferably dime-size. Representative resins are indicated in the examples to follow and a chemical description of such resins is now given as follows: VBR7059 is a pentaerythritol ester of tall oil resin type resin having an acid number of 18–20 and a melting point of 125° C. and is made by Nelio Chemical Company, Inc.; Pentalyn K is a pentaerythritol ester of dimerized wood rosin also made by Hercules Powder Company; Picco 6100–3 is made by Pennsylvania Industrial Chemical Corporation and is a nonpolar alkylated aromatic hydrocarbon thermoplastic polymer having a softening point of 100° C., a specific gravity of 1.06, an Iodine number of 100 and an acid number of less than 1; and VBR–710 resin is a maleic acid adduct of rosin characterized by an acid number of 245–260 and a melting point of 135–145° C., made by Nelio Chemical Inc.

Generally, a minor amount of solvent is employed in the present process which amount is sufficient to only soften the resin. The type of solvent will be determined by the resin as well as its boiling point. The following solvents can be used such as toluene, V.M.&P. naptha, mineral spirits, trichlorethylene, parachlorethylene, carbon tetrachloride, alcohol or similar organic liquids.

The form of press cake of the pigment is not critical and any form is operable in the present process whether it results directly from a chemical reaction, an acid pasting process or a grinding procedure. The press cake can have a claylike consistency or it can be of a watery nature. At either extreme or any form inbetween, the pigment can be quickly transferred into the resin while in a stiff, doughlike, plastic state.

Neither is there any restriction regarding the type of pigments which can be transferred from the press cake into the resin. The phthalocyanine pigments represented by either chlorinated or unchlorinated copper phthalocyanine blue, other metal phthalocyanine such as nickel, cobalt and iron phthalocyanines, metal-free phthalocyanine, and polychloro copper phthalocyanine green are operable, as well as vat dye pigments, such as idanthrone, halogenated idanthrones, flavanthrone yellow, dibenzanthrone green, dichloro isoviolanthrone, dibromo anthanthrone, pyranthrone, brominated pyranthrones (orange and scarlet), perylene red, acridone and oxazole reds, thio indigo and halogenated thio indigo reds and maroons. Other organic pigment types also advantageously converted by the method hereof include carbazole dioxazine violet, also called Pigment Fast Violet R Base; red to violet quinacridone pigments. Azo pigments and metal chelate azo pigments can also be employed. Inorganic pigments such as titanium dioxide and carbon black are also advantageously utilized.

In the examples to follow certain pigments in the form of water wet press cakes are mentioned. The amount of pigments and their chemical compositions are as follows: Benzidine Yellow water wet press cake is 21.4 percent pigment and the product of coupling acetoacetanilide with tetrazotized dichlorobenzidine; Permanent Red 2B water wet press cake which is 23.5 percent pigment and is the calcium salt of the product diazotizing 6-amino-4-chloro-m-toluene sulfonic acid coupled with beta-oxy-naphthoic acid; Red Lake C pulp which is 20.3 percent pigment and is the barium salt of the product formed by diazotizing 2-chloro-5-amino-toluene-4-sulfonic acid coupled with beta-naphthol; copper phthalocyanine press cake which is 25.0 percent pigment; Phloxine water wet press cake which is a lead lake of eosine having a pigment content of 22.7 percent; and Calcium Lithol press cake which is 18.3 percent pigment and is the calcium salt of the product prepared by diazotizing 2-naphthylamine-1-sulfonic acid coupled with beta-naphthol.

A thorough working of the thermoplastic resin while in the doughlike state and at the designated temperature range of 220°–300° F. is essential in order to completely disperse the pigment from the press cake throughout the resin. The preferred type of mixing device is of the Baker-Perkins type but any device capable of mixing masses of doughlike consistency can be used. Examples of such are the Werner-Pfleiderer flusher, Banbury mixer, the well-known two-roll mills, and the Ko-Kneader continuous mixing devices manufactured by Baker-Perkins.

The following specific examples are intended for the purpose of illustrating the present invention. They should not be construed as limiting the invention to the precise ingredients, amounts or conditions specified.

EXAMPLE I

Into a 0.7 gallon Baker-Perkins flusher are placed 600 g. of VBR7059 resin which was mixed with 50 g. of an aliphatic hydrocarbon distillate having a boiling range of 201°–217° F. and a specific gravity of 0.745, commonly known as Lactol Spirits. The resin and solvent were mixed in the flusher until the resin acquires a stiff, taffylike appearance. To the conditioned resin were added 891 g. of benzidine yellow water wet press cake. The flusher was operated until a water break occurred. The resulting water was poured off and 890 g. of a additional press cake were added and the unit again operated until additional water breaks from the mixture, at which time the water is again decanted. The resulting mass was then washed with two 1 liter portions of clean water. The flusher was then put under a vacuum of 23 inches of Hg and operated until all residual water and Lactol Spirits were evaporated. The resulting doughlike mass which consisted essentially of pigment and resin was worked at a temperature of 280° F. for about 1 hour after which time it was removed from the flusher and pulverized into a powder.

EXAMPLE II

Three hundred and sixty grams of the powder obtained from example I were mixed for 10 minutes with mechanical agitation with 140 g. of No. 470 oil which is a petroleum distillate of aliphatic hydrocarbon having a boiling range of 468°–510° F. and a specific gravity of 0.806. This results in a printing ink of excellent quality and gloss.

EXAMPLE III

A 0.7 gallon Baker-Perkins flusher was charged with 300 g. of Pentalyn K, 50 g. toluene and 638 g. of Permanent Red 2B water wet press cake. The flusher was operated until water broke from the resulting mixture. The water was decanted and an additional 637 g. of press cake and 35 g. of toluene were added and the flusher operated until additional water broke from the mixture. The water was poured off and the resulting mixture washed with 1 liter of clean water. The flusher was put under a vacuum of 23 inches of Hg and operated until essentially all remaining water and toluene were evaporated. The resin-pigment mass was worked at a temperature of 280° F. for about 1 hour, after which the time the mass of pigment and resin was cooled, removed from the flusher and pulverized into a powder.

EXAMPLE IV

All of the powdered material obtained from example III was mixed in a sufficient amount of No. 470 oil as described in example II resulting in an ink of superior quality.

EXAMPLE V

A 0.7 gallon Baker-Perkins flusher was charged with 100 g. of Picco 6100–3 resin and 985 g. of Red Lake C pulp. The flusher was operated and heated until the contents reached 160° F. at which time an additional 50 g. of Picco 6100–3 resin and 75 g. of toluene were added. A water break occurred and the water was poured off. An additional 985 g. of press cake were added along with 25 g. of toluene and 20 g. of Picco 6100–3 resin. The flusher was again operated until a second water break resulted from the thermoplastic mass. This water was also poured off and the resulting mixture in the flusher was washed with clean water. The flusher was put under a vacuum of 23 inches of Hg and the residual water and toluene were evaporated from the mixture and the resin-pigment mass worked at a temperature of 280° F. for 1 hour. The product was then removed from the flusher and pulverized.

EXAMPLE VI

One part of the resinated pigment product as prepared in example V was mixed with 1.1 parts of a petroleum distillate having a boiling range of 315°–415° C. and a specific gravity of 0.930 resulting in an ink of excellent quality.

EXAMPLE VII

Six hundred and fifty grams of VBR7059 resin, 100 g. of toluene and 1400 g. of copper phthalocyanine press cake were charged into a 0.7 gallon Baker-perkins flusher and the flusher operated until the water broke from the pulp and the pigment transferred to the organic phase. The resulting water was poured off and the resulting mixture was washed with plain water. A vacuum of 23 inches of Hg was applied to the flusher and any residual water and toluene were evaporated from the resulting mass which was worked for 1 hour at a temperature of 240° F. The pigment resin mass was removed from the flusher and pulverized.

EXAMPLE VIII

One part of the pigmented resin as obtained from the example VII was mixed with one-half part of the No. 470 oil petroleum distillate described in example II which results in a printing ink of excellent quality.

EXAMPLE IX

To a 0.7 gallon Baker-Perkins flusher was charged 500 g. of a VBR7059 resin and 1763 g. of Phloxine water wet press cake. The flusher was operated as described in example VII except the working temperature of the resin pigment mass was 230° F. After the working period, the pigmented resin was removed and pulverized into a powder.

EXAMPLE X

An ink of excellent quality resulted when 200 g. of the powdered resin pigment mixture obtained from example IX was stirred for 10 minutes with 75 gms of the petroleum distillate described in example II.

EXAMPLE XI

A 0.7 gallon Baker-Perkins flusher was charged with 700 g. of VBR-710 resin, 50 g. of toluene, 1640 g. of Calcium Lithol and 10 g. of lecithin. The flusher was then operated as described in example VII except the working temperature was 270° F. After the working period, the pigmented resin was removed from the flusher and pulverized.

EXAMPLE XII

A moisture set ink of excellent quality resulted when 100 parts of the pigmented resin obtained from example XI were mixed with 83 parts of dipropylene gylcol.

EXAMPLE XIII

A Baker-Perkins flusher of 0.7 gallon capacity was charged with 435 g. of a VBR7059 resin, 15 g. of lecithin, 1050 g. of titanium dioxide, and 40 g. of toluene. The flusher was operated until the contents appeared mixed, then a vacuum of 20 inches of Hg was applied until all the toluene was evaporated. The pigmented resin was worked for 1 hour at 245° F. and subsequently removed from the flusher and pulverized into a powder.

EXAMPLE XIV

An ink of excellent quality was made by mechanically stirring 300 g. of the powdered pigment resin obtained from example XIII with 100 g. of the petroleum distillate as described in example II.

EXAMPLE XV

| Ingredients | Amount in Pounds |
| --- | --- |
| Benzidine Yellow Press Cake Pigment | 221 |
| Toluol | 60 |
| VBR–701 Resin | 479 |
| Triethylene Glycol | 14 |

The entire 479 pounds of the resin was placed in a 150 gallon Baker-Perkins flusher and 15 pounds of the toluol added to the resin. The resulting mixture was mixed without heat until dust occurred. A sufficient amount of water was added to prevent dusting. After 10 to 15 minutes of pulverizing, steam was injected into the mass and a small amount of toluol also added sufficient to make it workable without overloading the amperage on the flusher. When mixture is entirely massed, steam is shut off and resulting resin product is worked until temperature builds up to about 200° F. and acquires a glossy, stringy, taffylike appearance. The temperature is controlled and prevented from rising much above 200° F. by the addition of small amounts of ice. Mixing is continued until the resin product is grit free.

To the previously prepared resin is added portionwise one-twelfth amounts of the wet pigment press cake. The thick viscous resin will become less viscous with the addition of each one-twelfth portion and water will break from the resin pigment mixture. Before additional press cake is added, the resin-pigment mixture should be worked to a state where it regains a stringy, taffylike appearance. After one-half of the press cake has been added, sufficient toluol is added to clear water of any pigment. The batch is massed until it is clear and the water poured therefrom. The remaining portions of press cake are added to the cleared resin-pigment mixture as previously outlined and cleared in the same described manner. The water which breaks from the resulting mixture is again poured off and the triethylene glycol added. The resulting mass was worked for 1½ hours with the periodic use of a vacuum of 23 inches Hg. During the working of the pigment-resin mass the temperature thereof will rise to 280° F. whereby all moisture and toluol is azeotropically removed. It is important that the vacuum be employed periodically so as not to cause the temperature to drop to a point where the mass will solidify and crumble. After 1½ hours of working the resin-pigment mass, a grit-free product is obtained which upon cooling is removed from the flusher and pulverized.

The grit-free product can be incorporated into an ink formulation as indicated in example II.

In the preceeding examples certain additives were employed in conjunction with the pigment and the thermoplastic resin such as lecithin and triethylene glycol. The purpose of the lecithin is to wet the pigment, while the triethylene glycol employed in example XV serves to plasticize or soften the resin.

The quality of an ink is determined mainly by freedom from grits. The resinated pigment of the present invention when incorporated into an ink formulation results in an ink having no grits thus resulting in an ink of high quality. The problems associated with a gritty ink are well appreciated by those skilled in the art.

Current flushing methods wherein water wet press cake is flushed into an organic phase composed of a varnish takes normally on the average of about 18 hours. In the present process, the water wet press cake can be incorporated into a solid resin in about 6 hours.

The present invention is primarily concerned with the preparation of pigmented resins having a high concentration of pigment which is in the range of about 50–80 percent based on the total resin-pigment mixture. However, lower concentrations of 25–50 percent are also operable for dispersing in a vehicle for a paint formulation.

It will thus be seen from the foregoing that there is now provided a novel process for preparing a resin coated pigment which eliminates the previously employed step of drying and grinding the water wet press cake. The present novel process results in a product which is readily dispersible in an ink solvent or vehicle to instantly form an ink having superior properties than any previously known resin coated pigment or dry pigment has been able to render. The present process saves considerable time and money since less equipment and handling need be used both in forming the resin coated pigment and the final ink product. Further, the resin coated pigment produced by the present process is grit-free and readily mixes with the proper solvent to form a grit-free ink or paint.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. A method of preparing a resin coated pigment comprising combining a pigment in the form of a water wet press cake with a resin in the form of a thick plastic, kneadable mass, intermixing said press cake containing said pigment with said resin in said thick plastic, kneadable state, removing the water from the resulting mixture, working said thick plastic, kneadable mass at an elevated temperature of at least about 220° F. to effect a hot dry plastic pigment-resin dispersion, said elevated temperature being effected substantially by said working and cooling the resulting mixture to provide a dry and uniform mass of pigment and resin which readily disperses in a vehicle.

2. A method of preparing a resin coated pigment comprising combining an organic pigment in the form of a water wet press cake with a resin and a suitable solvent for said resin, said solvent present in an amount to soften said resin, admixing said press cake containing said pigment with said resin and said solvent while maintaining said resin in a thick plastic, kneadable mass, removing the water and solvent from the resulting mixture, working said thick plastic, kneadable mass at an elevated temperature of at least about 220° F. to effect a hot dry plastic pigment-resin dispersion, said elevated temperature being effected substantially by said working and cooling the mixture to provide a dry and uniform mass of pigment and resin which readily disperses in a vehicle.

3. A method of preparing a resin coated pigment comprising combining a pigment in the form of a water wet press cake with a resin, maintaining said resin in the form of a thick plastic, kneadable mass while adding a suitable solvent for said resin, said solvent present in an amount to soften said resin, admixing said press cake containing said pigment with additional resin, removing said solvent and water from the resulting mixture, working said thick plastic, kneadable mass at an elevated temperature of at least about 220° F. to effect a hot dry plastic pigment-resin dispersion, said elevated temperature being effected substantially by said working and cooling the mixture to provide a dry and uniform mass of pigment and resin which readily disperses in a vehicle.

4. A method of preparing a resin coated pigment comprising combining a pigment in the form of a water wet press cake with a resin and a suitable solvent for said resin, said solvent present in an amount to soften said resin, mixing said press cake containing said pigment with said resin and said solvent, removing the major portion of the water to effect a thick plastic, kneadable mass, thoroughly mixing said mass to azeotropically drive off substantially all of the remaining traces of water and solvent and at an elevated temperature of at least about 220° F. to effect a hot dry plastic pigment-resin dispersion, said elevated temperature being effected substantially by said mixing and cooling the resulting mixture to provide a dry and uniform mass of pigment and resin which readily disperses in a vehicle.

5. A method of preparing a resin coated pigment comprising combining a pigment in the form of a water wet press cake with a resin and suitable solvent for said resin, said solvent present in an amount to soften said resin, mixing said press cake containing said pigment with said resin and said solvent and removing the major portion of the water to effect a thick plastic, kneadable mass, thoroughly mixing said mass to azeotropically drive off substantially all of the remaining traces of water and solvent, working said mass at an elevated temperature of at least about 220° F. to effect a hot dry plastic pigment-resin dispersion, said elevated temperature being effected substantially by said working, cooling the resulting mixture to provide a dry and uniform solid mass of pigment and resin and pulverizing said dry and uniform, solid mass whereby said pulverized mass readily disperses in a vehicle.

6. A method of preparing a resin coated pigment comprising admixing a pigment in the form of a water wet press cake with a granulated resin and a solvent in an amount to soften said resin and form a resin-solvent phase, mixing said mixture to cause a transfer of the pigment to the resin-solvent phase, removing the water therefrom, repeating said addition of additional press cake and solvent to the resin-solvent phase in the previously described manner and again removing water therefrom until a predetermined ratio of pigment to resin is reached to effect a thick plastic, kneadable mass, mixing said mass until sufficient heat is generated to effect a temperature in said mass in the range of about 220°–300° F. and azeotropically drive off substantially all of the water and solvent from the resulting mixture to provide a hot, dry plastic pigment-resin dispersion, said temperature range being maintained throughout said mixing and being effected substantially by said mixing and cooling the dispersion to provide a uniform mass of pigment and resin which crumbles to a powder.

7. A method of preparing a resin coated pigment comprising combining a preselected portion of a pigment in the form of a water wet press cake with a resin and a suitable solvent therefor, said solvent present in an amount to soften said resin, admixing said press cake portionwise with said resin and said solvent until a substantial portion of the water in the press cake breaks therefrom, removing said water, admixing a second portion of a preselected amount of said press cake portionwise with said resin and said solvent containing said first portion of said pigment until a substantial amount of the remaining water in the pigment-resin solvent mixture breaks therefrom, removing said water to effect a thick plastic, kneadable mass and thoroughly mixing said mass to azeotropically drive off substantially all of the remaining traces of water and solvent, working said mass at an elevated temperature of at least about 220° F. for a period of between about 1–2 hours to effect a hot dry plastic pigment-resin dispersion, said elevated temperature being effected substantially by said working and cooling the resulting mixture to provide a dry and uniform mass of pigment and resin which readily disperses in a vehicle to form an ink.

8. A method of preparing a resin coated pigment comprising combining a pentaerythritol ester or tall oil rosin resin and an alipathic hydrocarbon petroleum distillate solvent sufficient to soften said resin, admixing a preselected amount of benzidine yellow pigment in the form of a water wet press cake until a first water break occurs, removing said water breaking therefrom, admixing an additional amount of said press cake with said resin and solvent containing said first portion of said pigment and mixing until a second water break occurs, removing said water breaking therefrom, thoroughly mixing the resulting resin-pigment mixture until all residual water and solvent are evaporated to effect a thick plastic, kneadable mass and at a temperature in the range of about 220°–300° F. to effect a hot dry plastic pigment-resin dispersion, said temperature range being effected substantially by said mixing and cooling and pulverizing the resulting resin coated pigment which is readily dispersible in a vehicle.

9. A method of preparing a resin coated pigment comprising combining a pentaerythritol ester of dimerized wood rosin resin, toluene in an amount sufficient to soften said resin and a preselected amount of a pigment being a 6-amino-4-chloro-m-toluene sulfonic acid coupled with beta-oxy naphthoic acid in the form of a water wet press cake and mixing said mixture until a first water break occurs, removing said water breaking therefrom, adding an additional amount of said water wet press cake and toluene to said resin and said first portion of said pigment and mixing until a second water break occurs, removing said water breaking therefrom, and mixing said resulting mixture until essentially all of the water and toluene is evaporated to effect a thick plastic, kneadable mass and at a temperature in the range of about 220°–300° F. to effect a hot dry plastic pigment-resin dispersion, said temperature range being effected substantially by said mixing and cooling and pulverizing the resulting resin coated pigment which is readily dispersible in a vehicle.

10. A method of preparing a resin coated pigment comprising combining a nonpolar alkylated aromatic hydrocarbon thermoplastic polymer resin, a diazotized 2-chloro-5-aminotoluene-4-sulfonic acid coupled with beta-naphthol pigment in the form of a water wet press cake pigment, and toluene in an amount sufficient to soften said resin, heating and mixing said mixture to about 160° F. and adding additional amounts of said water wet press cake as well as additional amounts of toluene and said resin to said resin and said solvent containing said first portion of said pigment and mixing said resulting mixture until a water break occurs, removing said water breaking therefrom and mixing said resulting mixture until residual water and toluene are evaporated to effect a thick plastic, kneadable mass and at a temperature in the range of about 220°–300° F. to effect a hot dry plastic pigment-resin dispersion, said temperature range being effected substantially by said mixing and cooling and pulverizing the resulting resin coated pigment which is readily dispersible in a vehicle.

11. A method of preparing a resin coated pigment comprising combining a pentaerythritol ester of tall oil rosin resin, toluene in an amount sufficient to soften said resin and a copper phthalocyanine pigment in the form of a water wet press cake, mixing said materials until water breaks from the resulting mixture and the pigment transferred to the organic phase, removing the water breaking therefrom, and mixing said material until substantially all residual water and toluene are evaporated to effect a thick plastic, kneadable mass and at a temperature in the range of about 220°–300° F. to effect a hot dry plastic pigment-resin dispersion, said temperature range being effected substantially by said mixing and cooling and pulverizing the resulting resin coated pigment which is readily dispersible in a vehicle.

12. A method of preparing a resin coated pigment comprising combining a pentaerythritol ester of tall oil rosin resin, an eosine lake pigment in the form of a water wet press cake, and toluene in an amount sufficient to soften said resin, mixing said materials until water breaks from the resulting mixture and the pigment transferred to a resulting organic phase, removing the water breaking therefrom, and mixing said material until substantially all residual water and toluene are evaporated to effect a thick plastic, kneadable mass and at a temperature in the range of about 220°–300° F. to effect a hot dry plastic pigment-resin dispersion, said temperature range being effected substantially by said mixing and cooling and pulverizing the resulting resin coated pigment which is readily dispersible in a vehicle.

13. A method of preparing a resin coated pigment comprising combining a maleic acid adduct of rosin resin, toluene in an amount sufficient to soften said resin and a calcium lithol pigment, mixing said materials until water breaks from the resulting mixture and the pigment transferred to a resulting organic phase, removing the water breaking therefrom, and mixing the resulting material until substantially all residual water and toluene are evaporated to effect a thick plastic, kneadable mass and at a temperature in the range of about 220°–300° F. to effect a hot dry plastic pigment-resin dispersion, said temperature range being effected substantially by said mixing and cooling and pulverizing the resulting resin coated pigment which is readily dispersible in a vehicle.

14. A resin coated pigment composition of high tinctorial strength which is substantially grit free and substantially free of volatile solvents and water, said composition comprising a resin having a melting point of at least about 100° C. and solidified from a plastic state, said resin being selected from the group consisting of a pentaerythritol ester of tall oil rosin, a pentaerythritol ester of dimerized wood rosin and a nonpolar alkyl aromatic hydrocarbon thermoplastic polymer and a pigment in an amount equal to at least 25 percent by weight of the combined weight of the pigment and resin.

* * * * *

UNITED STATES PATENT OFFICE
CERTIFICATE OF CORRECTION

Patent No. 3,615,812          Dated October 26, 1971

Inventor(s) Daniel Clark et al

It is certified that error appears in the above-identified patent and that said Letters Patent are hereby corrected as shown below:

Column 2, line 25, before "small" insert --a--.

Column 2, line 71, for the first word "resin" read --rosin--.

Column 4, line 45, for "the time" read --time--.

Column 8, line 49 (claim 8, line 2), for "or" read --of--.

Signed and sealed this 25th day of April 1972.

(SEAL)
Attest:

EDWARD M. FLETCHER, JR.
Attesting Officer

ROBERT GOTTSCHALK
Commissioner of Patents